(12) United States Patent
George

(10) Patent No.: US 6,404,462 B1
(45) Date of Patent: Jun. 11, 2002

(54) DIGITAL CONVERGENCE IMAGE

(75) Inventor: John Barrett George, Carmel, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/409,148

(22) Filed: Sep. 30, 1999

(51) Int. Cl.[7] .......................... H04N 3/22; H04N 3/223; H04N 9/28
(52) U.S. Cl. ..................... 348/806; 348/747; 348/807
(58) Field of Search ................................ 348/745, 746, 348/747, 806, 807; H04N 3/223, 3/23, 3/22, 9/28, 3/26

(56) References Cited

U.S. PATENT DOCUMENTS 6,297,859 B1 * 10/2001 George ..................... 348/747
6,333,768 B1 * 12/2001 Kawashima et al. ........ 348/806

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

An apparatus for convergence correction in a TV receiver with a CRT display comprises a display screen with photo sensors positioned adjacent to screen edges. A cathode ray tube generates a raster for illuminating the display screen and the photo sensors. A signal generator generates a video signal having a first part for convergence alignment and a second part having sufficient video signal amplitude to cause an average level of beam current loading corresponding to an average level that can occur during broadcast video reception. The video signal being coupled to the cathode ray tube for illuminating the display screen and sensors. The video signal facilitating convergence alignment with the average level of beam current loading to ensure that convergence alignment is maintained during broadcast video reception.

7 Claims, 2 Drawing Sheets

DIGITAL CONVERGENCE IMAGE

DIGITAL CONVERGENCE IMAGE

This invention relates generally to digital convergence of a cathode ray tube display, and in particularly to the selection of image elements for digital convergence.

BACKGROUND OF THE INVENTION

In a digital convergence system convergence values are determined for each display color and applied at an array of points located at intersections of an alignment grid superimposed on a black background. In a manual digital convergence system a user may manually adjust deflection parameters at the grid intersections, in either or both horizontal and vertical scan directions, to superimpose individual colored lines to form a white grid on the black background. These adjustment values are then stored for each grid intersection and subsequently readout to provide a converged display image. During the convergence adjustment process the alignment grid display must be stable and free from transient geometric distortions, for example, resulting from instability of deflection fields forming the scanned raster, or raster size variation due to power supply loading effects causing the CRT ultor or high voltage supply to vary. In a CRT display, image brightness is directly related to the scanning beam current, where the darkest area represents the smallest current and the brightest the greatest beam current. Thus it may be appreciated that the beam current varies dynamically at video frequency rates. It is well known that a scanned raster size is inversely proportional to the square root of the of the high voltage or EHT applied to the second anode of the CRT. Hence if the high voltage supply exhibits poor voltage regulation, for example with beam current variation, the high voltage value will vary in response to the displayed image brightness, typically dropping with beam current increase. Thus, the scanned raster size will vary particularly in the area of any high brightness image content. Thus it may be further appreciated that brightness modulation of the raster size is undesirable during normal image display, and is particularly problematic if present during convergence alignment giving rise to convergence errors.

SUMMARY OF THE INVENTION

An apparatus for convergence correction in a TV receiver with a CRT display comprises a display screen with photo sensors positioned adjacent to screen edges. A cathode ray tube generates a raster for illuminating the display screen and the photo sensors. A signal generator generates a video signal having a first part for convergence alignment and a second part having sufficient video signal amplitude to cause an average level of beam current loading corresponding to an average level that can occur during broadcast video reception. The video signal being coupled to the cathode ray tube for illuminating the display screen and sensors. The video signal facilitating convergence alignment with the average level of beam current loading to ensure that convergence alignment is maintained during broadcast video reception.

DETAILED DESCRIPTION

Figure 1:
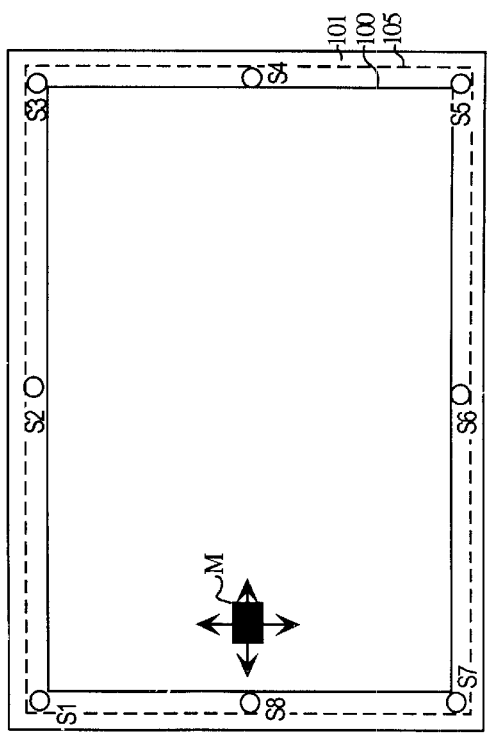
FIG. 1 illustrates an exemplary display screen with photo sensors located at the screen periphery.

FIG. 1 illustrates an exemplary display screen 101 of a video signal display apparatus employing convergence alignment by means of photo sensors located at the screen periphery. The display screen 101 is positioned within a frame which permits area 100 to be viewed and obscures part of the raster scanned area 105 extending beyond area 100. The exemplary photo sensors S1–S8 are located within the scanned but obscured viewing area. An alignment signal image block M is shown close to sensor S8 and, as depicted by the crossed arrows, may be positioned within the raster to illuminate any of photo sensors S1–S8 to facilitate convergence alignment by detection and measurement of the edges of image block M. With perfect convergence, the block position required for sensor illumination is known. However the actual displayed block position is subject to mis-convergence errors which may be measured by determining when the sensor detects the block edge. Thus a convergence error is represented by the difference between the theoretical converged position and actual detected position.

Figure 2:
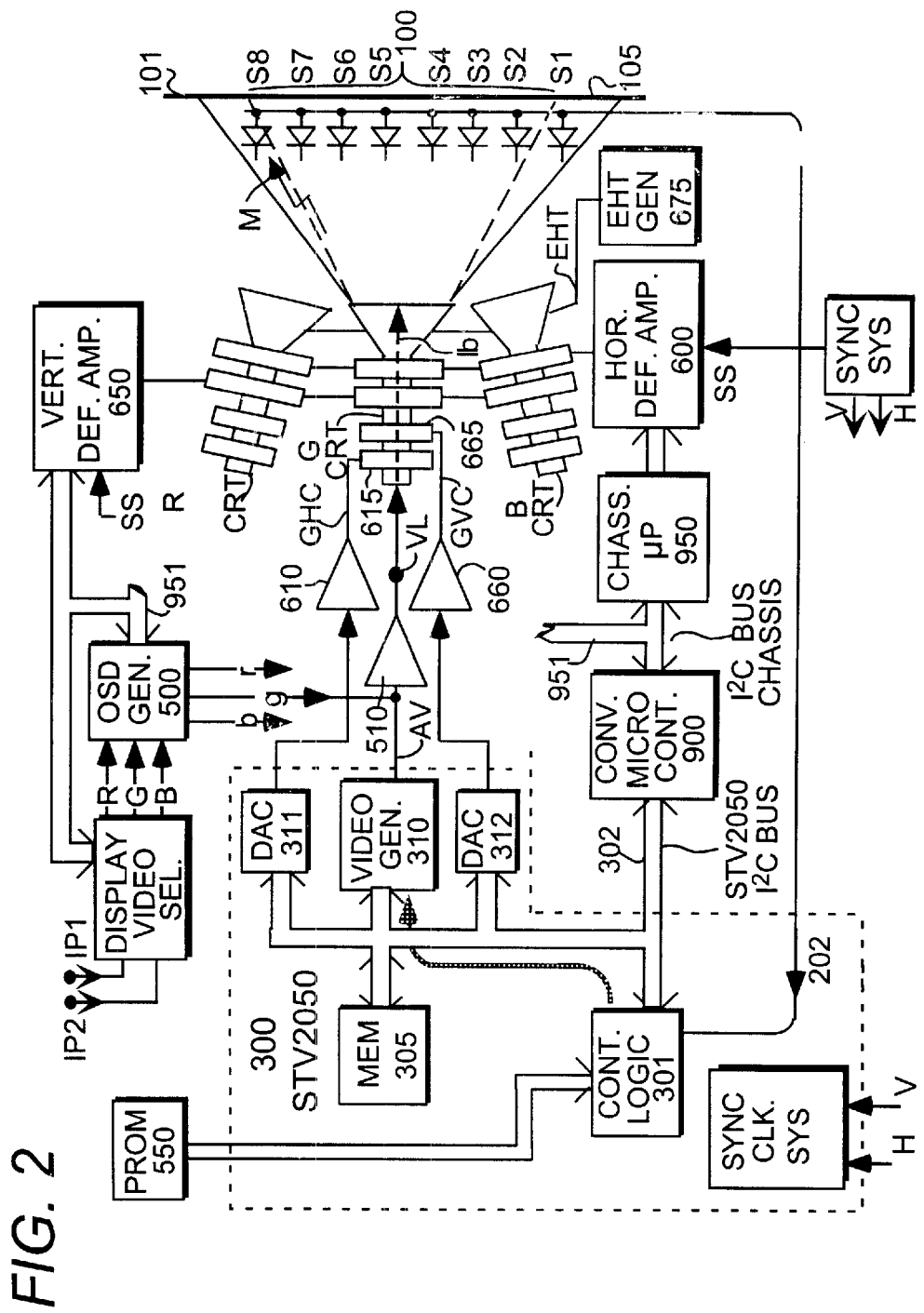
FIG. 2 illustrates an exemplary projection display apparatus including the display screen of FIG. 1.

An exemplary projection display apparatus with the display screen of FIG. 1 is depicted, in part, in FIG. 2. Three cathode ray tubes, RCRT, GCRT, BCRT form raster scanned images responsive to scanning signals generated by horizontal deflection amplifier 600 and vertical deflection amplifier 650. Cathode ray tube GCRT is illustrated with horizontal convergence coil 615 and vertical convergence coil 665 each of which are driven with corrective currents GHC and GVC generated by amplifiers 610 and 660 respectively. Convergence drive amplifiers 610 and 660 are each coupled to convergence correction signals formed by digital to analog converters 311 and 312 respectively, in response to digital control values derived from memory 305. An electronically erasable programmable read only memory PROM 550 is employed to save set up values which are loaded in to memory MEM305 during operation of the display.

A video signal VL is connected to exemplary cathode ray tube GCRT to modulate the magnitude of electron beam current Ib to form an intensity or brightness modulated image on the CRT face plate, representative of an electrical analog of an image. The brightness modulated image on the CRT face plate is projected to form an image on screen 101. The electron beam Ib generated within cathode ray tube GCRT is accelerated toward the face plate by a high voltage supply EHT, which may be generated by well known techniques. As described previously, if generator EHT 675 exhibits poor voltage regulation, the high voltage EHT will vary with beam current Ib in responsive to video signal VL, for example, voltage EHT will drop as current Ib increases. Thus the variation f high voltage will yield a corresponding variation in raster size.

Amplifier 510 is coupled to receive input signals from a plurality of signal sources, and generating at an output video signal VL. For example external video signals may be coupled from inputs 1 and 2 via an input selector which forms, at an output, component video signals R, G and B for coupling to an on screen display generator 500. Display generator 500 is controlled via data bus 951 from a chassis microcontroller 950. Thus in response to instructions from microcontroller 950 display generator 500 inserts characters into, or replaces video signals R, G and B from the input selector, with display signals, r, g and b, generated within the display apparatus. In addition, a further video signal AV outputted from a video generator 310 may be added to or may replace display signals, r, g and b. Video signal AV is generated by a digital convergence circuit 300, for example, as facilitated by ST Microelectronics integrated circuit type STV2050. Instructions to digital convergence circuit 300 are coupled via data bus 302 from microcontrollers 900 and 950 and select generation of ones of several differing convergence measurement and alignment video display test signals, for example, measurement block M, which may be positioned at any location within the raster 105 formed on screen 101.

The display screens shown in FIGS. 1, 3, 4 and 5 are depicted as white areas with black image detail, although such image display arrangements are possible, they are undesirable as will be described. Typically, convergence images are generated with a black screen and white or gray lines or characters. For convenience of illustration FIGS. 1, 3, 4 and 5 depict black image detail on a white back ground.

As described previously, it is essential that during convergence adjustment a raster displaying a setup grid or alignment image is stable and free from transient geometric distortions. Such transient geometric distortions may result from deflection field instability or raster size change with CRT high voltage supply variation. Furthermore, since images are portrayed by the CRT as brightness variation responsive to beam current variation, it is clearly advantageous to perform convergence adjustment at a beam current representative of an average displayed image brightness. Sustained observation of a broadcast television network image signal, monitored for a duration of 30 days determined that the image signal had an average signal level of approximately 30 IRE units. Thus to maintain a converged display condition it is advantageous to perform convergence adjustment at an average beam current representative of that resulting from reception of the average broadcast signal level.

Figure 3:
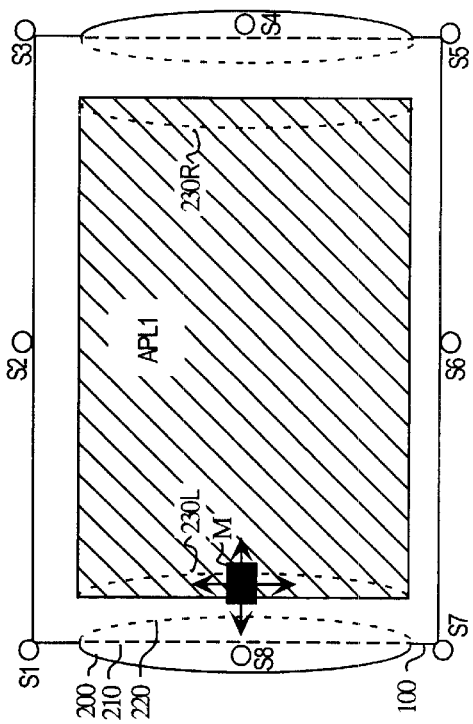
FIG. 3 illustrates an inventive image display arrangement on the exemplary display screen of FIG. 1.

A first inventive alignment image signal APL1 is illustrated in FIG. 3 where image APL1 is arranged to generate an average video level of 30 IRE units. The average image brightness produced by signal APL1 is proportional to the area of the displayed signal, or the video signal amplitude forming the image signal APL, or the combined effect of both the display area and the video signal amplitude. Thus by use of signal APL1, shown in FIG. 3, alignment signal image block M is positioned within the raster area such that each sensor detects an edge of the block. Since the perfectly converged position of the block for sensor illumination is known, the actual displayed position may be determined or measured when the sensor detects an edge of the block. Hence a convergence error is represented by the difference between the generated theoretically correct block placement and actual detected position.

Although, FIG. 3 illustrates inventive alignment at an average signal or beam current level by use of image signal APL1, FIG. 3 also illustrates a raster size change. Specifically FIG. 3 shows a dynamic raster change, but in addition, the overall raster size may also change as a consequence of both increased beam current required to display signal APL1, and inadequate regulation of the CRT high voltage supply. Furthermore, since CRT display images are portrayed by brightness modulation in response to beam current variation, such poor high voltage regulation may result in image dependent dynamic mis-convergence of a previously converged raster. In FIG. 3, the edge of the viewed area 100 is adjacent to photo sensors S1–S8 with dotted line 210 representing a correct, non distorted raster edge position at which an edge of alignment image block M may be detected by exemplary sensor S8. However, because this exemplary display apparatus exhibits poor EHT regulation, the high voltage is reduced as a consequence of the additional beam current required by the video level or brightness of signal APL1, and as described previously, the raster size is locally increased as depicted by raster edge line 200. Thus, as described, alignment image M is moved on the raster until detected by exemplary sensor S9 with the convergence error being determined as described. However, because the raster is locally distorted in the vicinity of sensor S8, the convergence error measured is erroneous and causes convergence correction which mis-positions the raster edge as depicted by line 220. This raster distortion also results in the misplacement of the displayed image as depicted by edge 230L and similarly for the right raster edge 230R of image signal APL1.

Figure 4:
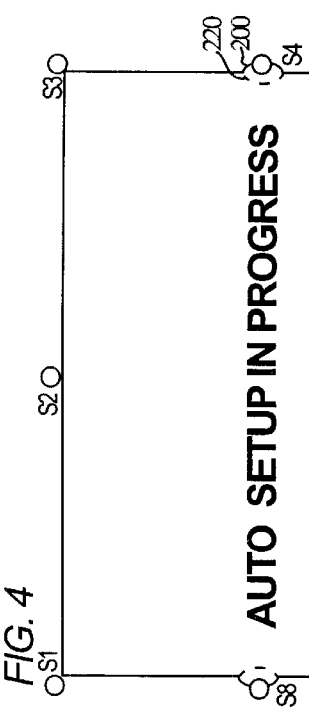
FIG. 4 illustrates raster distortion of the exemplary display screen.

FIG. 4 illustrates an on screen display message or OSD displayed on an exemplary display apparatus which, as previously described exhibits poor EHT regulation. Although average level or beam current determining image APL1 is absent from the FIG. 4, the brightness level of the OSD characters result in an increased beam current with a consequential reduction in high voltage and resultant local raster distortion. Thus FIG. 4 reveals that an on screen message can cause localized raster distortion as depicted by distortion 200, with consequential erroneous raster positioning 220 or correction when the OSD characters are absent. Hence if OSD messages are displayed during automated alignment or raster measurement, the characters may be advantageously located at screen locations which avoid edge photo sensors by employing raster line counts different from the nominal counts corresponding to the positions of edge photo sensors S1, S3, S4, S5, S7 and S8.

Figure 5:
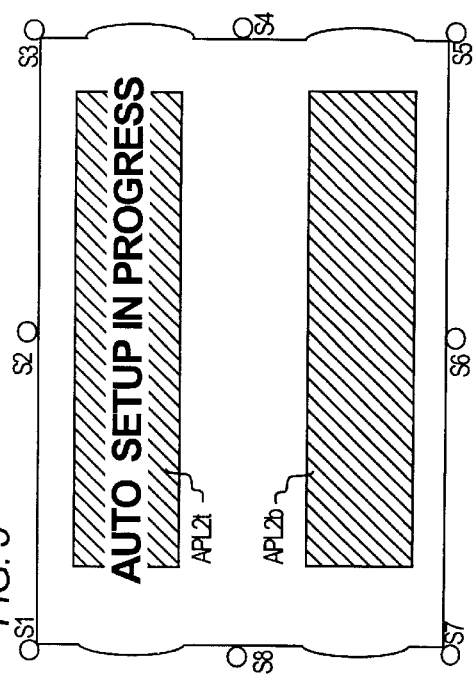
FIG. 5 illustrates a further inventive image display arrangement.

FIG. 5 illustrates a further inventive alignment display image which facilitates raster measurement at predetermined average beam current by use of image blocks APL2t and APL2b which generate the predetermined average beam current with screen positions which avoid localized raster distortion in the vicinity of the measurement photo sensors. Image block APL2t is depicted including OSD message characters which increase the standardized beam current generated by image APL2t. However, advantageously image block APL2t is controllably adjusted, via control logic 301 in response to the added message characters, to maintain the desired the standardized beam current representative of an average picture level. The beam current resulting from image block APL2t may be controlled by adjustment of the video signal amplitude forming the image block responsive to the number of message characters and their respective video signal amplitudes. Beam current due the image block APL2t may also be controlled by changing the displayed area of the image block in response to the message characters. For example, horizontal or vertical duration, or raster line count may be dynamically adapted during an on screen display to maintain the desired average picture beam current. Although in the forgoing description, image block APL2t has been manipulated in video level and or display area to establish and maintain a predetermined average beam current, such dynamic beam current compensation may be applied to image block APL2b to maintain the desired average beam current when using an on screen message.

What is claimed is:

1. Apparatus for convergence correction in a TV receiver with a CRT display, comprising:

a display screen with photo sensors positioned adjacent to screen edges;

a cathode ray tube generating a raster for illuminating said display screen and said photo sensors; and, a signal generator generating a video signal having a first part for convergence alignment a second part having sufficient video signal amplitude to cause an average level of beam current loading corresponding to an average level that can occur during broadcast video reception, said video signal being coupled to said cathode ray tube for illuminating said display screen and sensors, said video signal facilitating convergence alignment with said average level of beam current loading to ensure that convergence alignment is maintained during broadcast video reception.

2. The apparatus of claim 1, wherein said first part of said video signal is controllably generated to position a display image of said first part to illuminate one of said photo sensors.

3. The apparatus of claim 1, wherein said second part of said video signal is controllably generated to position a display image thereof at a raster location spatially displaced from said photo sensors.

4. The apparatus of claim 1, wherein said second part of said video signal has video signal amplitude of approximately 30 IRE units.

5. The apparatus of claim 1, wherein said second part of said video signal is other that of sufficient video signal amplitude and is controlled to form a displayed raster size for generating said average level of beam current loading.

6. An image display signal for convergence alignment in a CRT display, comprising:

a display screen with photo sensors positioned adjacent to screen edges;

a cathode ray tube generating a raster for illuminating said display screen and said photo sensors; and, a signal generator generating a video signal having a first part for convergence alignment and a second part having an amplitude to produce a perceptible image on less than the entire raster, said video signal being coupled to said cathode ray tube for illuminating said display screen and sensors, wherein said first part of said video signal is controllably generated to position a display image of said first part at a raster location to illuminate one of said photo sensors, and said second part of said video signal being controllably generated to position said perceptible image at a raster location spatially displaced from said one of said photo sensors.

7. The image display signal of claim 1, wherein said second part of said video signal is an on screen display message controllably positioned on said raster to avoid raster distortion adjacent to said one of said photo sensors.

* * * * *